United States Patent
Riittinen et al.

(10) Patent No.: US 7,623,500 B2
(45) Date of Patent: Nov. 24, 2009

(54) METHOD AND SYSTEM FOR MAINTAINING A SECURE TUNNEL IN A PACKET-BASED COMMUNICATION SYSTEM

(75) Inventors: Heikki Riittinen, Helsinki (FI); Juha P. Savolainen, Espoo (FI)

(73) Assignee: Nokia Corporation, Espoo (FI)

( * ) Notice: Subject to any disclaimer, the term of this patent is extended or adjusted under 35 U.S.C. 154(b) by 437 days.

(21) Appl. No.: 10/583,853

(22) PCT Filed: Dec. 22, 2003

(86) PCT No.: PCT/FI03/00981

§ 371 (c)(1), (2), (4) Date: Jun. 21, 2006

(87) PCT Pub. No.: WO2005/062545

PCT Pub. Date: Jul. 7, 2005

(65) Prior Publication Data

US 2007/0053328 A1   Mar. 8, 2007

(51) Int. Cl.
  *H04W 4/00* (2009.01)
  *H04L 12/28* (2006.01)
(52) U.S. Cl. .................... 370/338; 370/389
(58) Field of Classification Search .......... 370/338, 370/401, 474, 349, 389; 455/432; 709/246, 709/227
See application file for complete search history.

(56) References Cited

U.S. PATENT DOCUMENTS

| 5,416,842 | A | 5/1995 | Aziz |
| 7,366,794 | B2* | 4/2008 | Poeluev ................. 709/246 |
| 2002/0152325 | A1* | 10/2002 | Elgebaly et al. ......... 709/246 |
| 2003/0069016 | A1* | 4/2003 | Bahl et al. ............... 455/432 |
| 2003/0191843 | A1* | 10/2003 | Balissat et al. .......... 709/227 |
| 2004/0073642 | A1 | 4/2004 | Iyer |
| 2005/0013280 | A1* | 1/2005 | Buddhikot et al. ...... 370/349 |

* cited by examiner

*Primary Examiner*—Charles N Appiah
*Assistant Examiner*—Kiet Doan
(74) *Attorney, Agent, or Firm*—Harrington & Smith, PC

(57) ABSTRACT

The invention relates to a mechanism for maintaining a secure tunnel in a packet-based communication system. A secure tunnel is established between a security gateway and a mobile terminal being located at a first address in a first network, wherein the security gateway connects the first network to a second network and the mobile terminal has a second address that identifies the mobile terminal in the second network. In the gateway, the tunnel is identified based on the second address in packets destined for the mobile terminal from the second network. A change is detected in the first address of the mobile terminal and an update message including a new address value of the first address is sent to the security gateway. Based on the update message, the first address associated with the secure tunnel is updated in the security gateway.

18 Claims, 3 Drawing Sheets

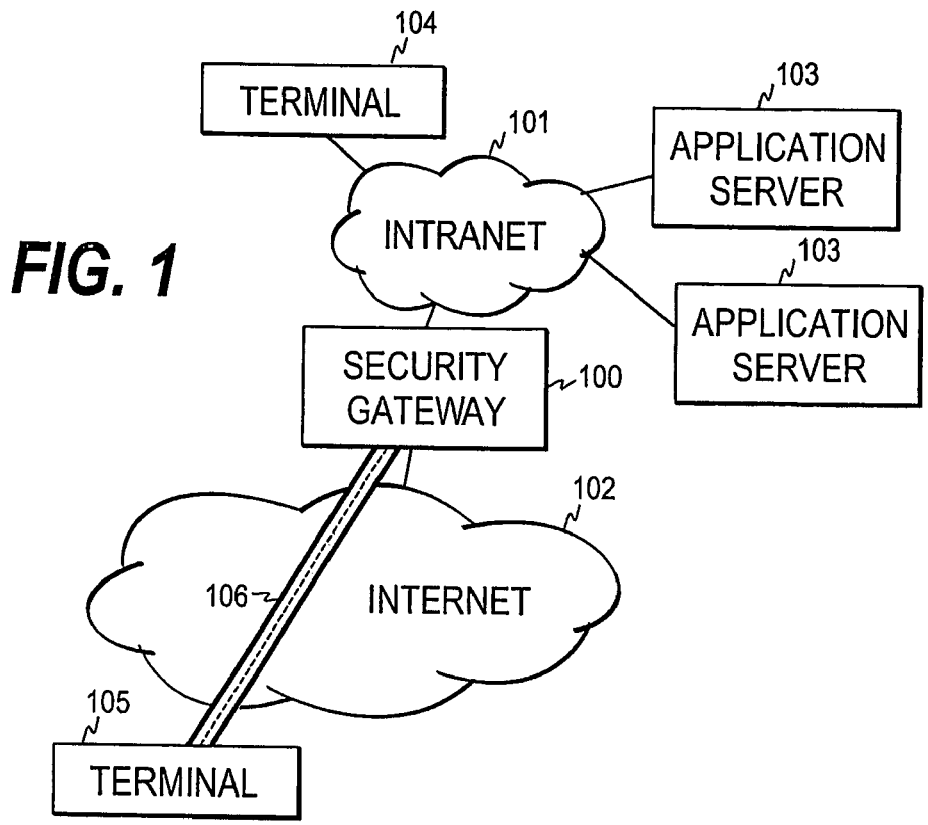
FIG. 1
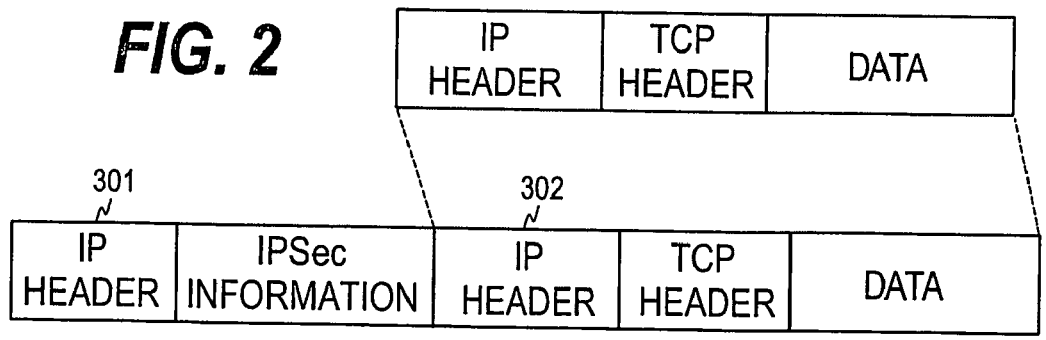
FIG. 2
FIG. 3 *PRIOR ART*
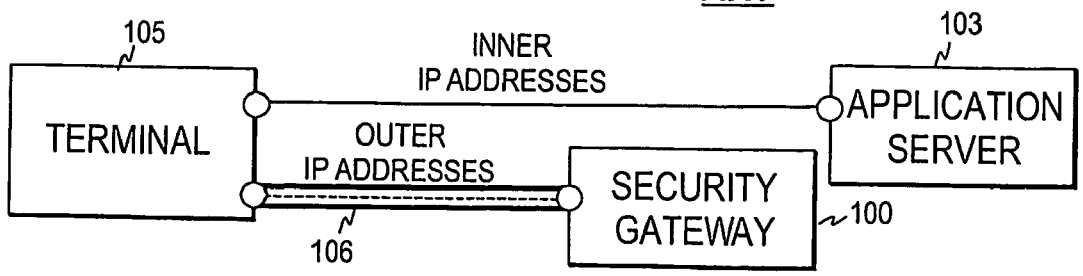
FIG. 4 *PRIOR ART*

METHOD AND SYSTEM FOR MAINTAINING A SECURE TUNNEL IN A PACKET-BASED COMMUNICATION SYSTEM

FIELD OF THE INVENTION

The present invention relates generally to mobility support in a packet-based communication system comprising a secure tunnel established for a mobile terminal. More particularly, the invention relates to a mechanism that allows the mobile terminal to move so that the corresponding end of the secure tunnel moves with the terminal.

BACKGROUND OF THE INVENTION

The protocols related to IP networks, such as the Internet, are developed by the Internet Engineering Task Force (IETF). One of the protocols is the IPSec (short for Internet Security), which is actually a set of protocols intended to support secure transmission of packets at the IP layer. The IPSec protocol set is commonly used to construct Virtual Private Networks (VPNs), i.e. networks which are constructed using public networks, such as the Internet, as the transport medium, but which can be accessed by authorized users only.

The IETF has also been developing support for mobile IP nodes for both versions of IP (i.e. for IPv4 and IPv6). The main results of this work are the two Mobile IP protocols, Mobile IPv4 (RFC 2002) and Mobile IPv6 (work in progress, assumed to reach RFC status soon).

In both versions of Mobile IP, the packets sent to the so-called home address, which is the permanent address of the mobile node, are forwarded to the mobile node when it is not located on the home link. An element called a home agent is located on the link within which the home address of the mobile node is located, i.e. on the so-called home link. The home agent captures all IP packets sent to the home address of the mobile node while the mobile node is not located on the home link, and forwards them to the current IP address of the mobile node, called the care-of address. In Mobile IPv4, the forwarding process utilizes so-called IP-in-IP tunneling, in which encapsulated packets are forwarded to the mobile node. Thus the destination address in the outer IP header of this IP-in-IP tunneling is the care-of address, while the destination address in the inner IP header is the home address of the mobile node.

In Mobile IPv6, the mobile node signals a change in its care-of address to the home agent by sending to the home agent the new care-of address in a message called a Binding Update. The home agent acknowledges this message by returning to the mobile node a message called a Binding Acknowledgement. In Mobile IPv4, the corresponding messages are the Registration Request sent from the mobile node to the home agent and the Registration Reply sent in the opposite direction.

Thus mobility in IP networks requires the use of home agents, which keep track of the current address of the mobile node.

A drawback related to the use of home agents is the high amount of protocol overhead needed to perform the above-mentioned tunneling. This may substantially degrade the performance of the system, especially in narrow bandwidth networks. A further drawback related to the current situation is that home agents are not commonly available.

A drawback related to the current IPSec implementations is, in turn, that they do not support mobility. Therefore, current IPSec implementations cannot utilize the above-described features of Mobile IPv4 and IPv6 supporting mobility.

The present invention seeks to provide mobility support for IPSec communication environments, such as for IPSec VPN implementations, without the above-mentioned drawbacks related to the Mobile IP.

SUMMARY OF THE INVENTION

The present invention seeks to bring about a novel mechanism for supporting mobility in IPSec communication environments.

In the present invention, secure tunnels created over public networks are maintained in a novel manner, which allows the identification and maintenance of the tunnel even if the local IP address of the terminal end of the tunnel changes. For packets destined for the terminal, the correct tunnel is identified based on the address that identifies the terminal in the network that is behind the secure tunnel, as seen from the terminal. Furthermore, the terminal sends an address update message through the tunnel when it detects that the said local address has changed. Based on the message, the address of the terminal end of the tunnel is updated in the opposite end of the tunnel.

Thus one embodiment of the invention is the provision of a method for maintaining a secure tunnel in a packet-based communication system. The method includes a step of establishing a secure tunnel between a security gateway and a mobile terminal being located at a first address in a first network, wherein the security gateway connects the first network to a second network and the mobile terminal has a second address that identifies the mobile terminal in the second network. The method further includes the steps of identifying the secure tunnel based on the second address in packets destined for the mobile terminal from the second network and detecting a change in the first address of the mobile terminal. The method also includes, sending, in response to the detecting step, an update message to the security gateway, wherein the update message includes a new address value of the first address and updating, based on the update message, the first address associated with the secure tunnel.

The present invention thus provides a Mobile-IP-like, IPSec-compatible solution for supporting mobility in Virtual Private Networks and in similar communication systems where a secure tunnel is established.

In another embodiment, the invention provides a mobile terminal for a packet-based communication system. The mobile terminal includes tunnel establishment means for establishing a secure tunnel to a security gateway through a packet network; wherein the security gateway is configured to connect a first network to a second network and the mobile terminal has a first address that depends on its current location in the first network and a second address that identifies the mobile terminal in the second network. The mobile terminal further includes address update means for sending an update message through said secure tunnel to the security gateway when the first address changes, wherein the update message includes a new address value of the first address.

In a further embodiment, the invention provides a security gateway for a packet-based communication system. The security gateway includes tunnel establishment means for establishing a secure tunnel to a mobile terminal located at a first address in a first network, wherein the security gateway is configured to connect the first network to a second network and the mobile terminal has a second address that identifies the mobile terminal in the second network. The security gateway further includes identification means for identifying the secure tunnel based on the second address in a packet originated from the second network and destined for the mobile terminal and address update means for updating the first address associated with the secure tunnel, the address update means being responsive to a message received from the mobile terminal, the message including a new value of the first address.

In still further embodiments, the invention provides a computer useable medium having computer readable program code embodied therein to enable a mobile terminal to communicate with a security gateway in a packet-based communication system. In one embodiment of the invention, the computer readable program code comprises program code for causing the mobile terminal to send an update message through a secure tunnel to the security gateway when a first address that depends on the mobile terminal's current location in the first network changes, wherein the update message includes a new address value of the first address. In another embodiment, the computer readable program code additionally comprises program code for causing the mobile terminal to establish the secure tunnel to the security gateway through a packet network.

The solution of the invention adds mobility support to IPSec-compatible implementations. The solution further allows mobility to be introduced without the introduction of home agents, whereby the above drawbacks related to home agents may be eliminated.

Other features and advantages of the invention will become apparent through reference to the following detailed description and accompanying drawings.

BRIEF DESCRIPTION OF THE DRAWINGS

In the following, the invention and many of its embodiments are described more closely with reference to the examples shown in FIG. 1 to 8 in the appended drawings, wherein:

FIG. 1 illustrates an example of a communication environment in which the embodiments of the present invention may be beneficially implemented;

FIG. 2 and FIG. 3 illustrate the operation of a security gateway in the IPSec tunnel mode;

FIG. 4 illustrates the use of IP addresses in the environment of FIG. 1;

DETAILED DESCRIPTION OF THE INVENTION

Figure 5:
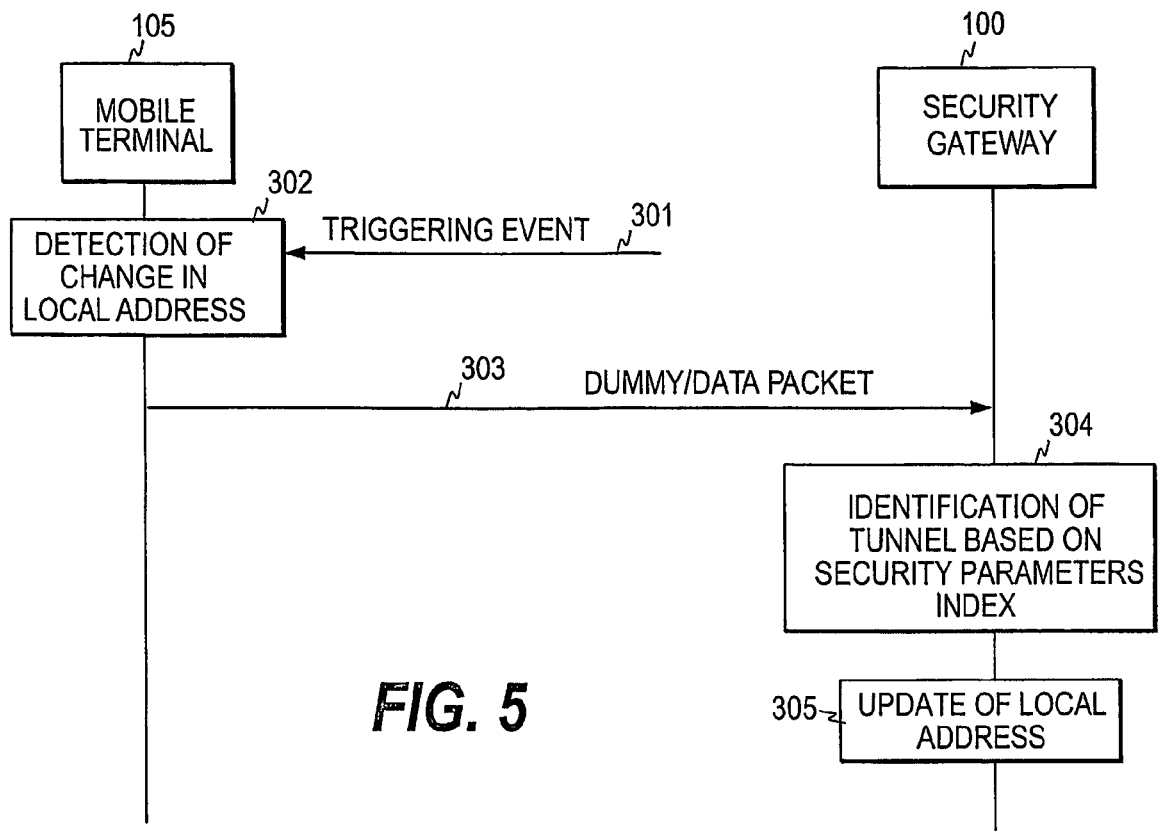
FIG. 5 illustrates the operation of the mobile terminal and the security gateway in one embodiment of the invention, when the mobile terminal detects that its local IP address has changed.

FIG. 1 shows an example of a typical communication environment in which the present invention can be applied. In the example of FIG. 1, a secure VPN is created by means of a security gateway 100 connecting a private IP network 101, such as an intranet of a corporation, to a public IP network 102, such as the Internet. The security gateway here refers to an intermediate system implementing IPSec protocols, i.e. the gateway is an IPSec-compatible network element. The intranet typically comprises one or more application servers 103, which may communicate with terminals 104, 105 connected either to the private network or to the public network. At least the terminals 105 intended for users outside the private network are provided with an IPSec compatible client program in order to enable the establishment of a secure communication tunnel 106 across the public network. It is assumed here that terminal 105 is a mobile terminal. One example of a mobile terminal is a handheld mobile telephone.

The secure tunnel between the security gateway and mobile terminal 105, being located outside the private network, is established using the standard IPSec process, which is based on the Internet Key Exchange (IKE) protocol, except that during the establishment of the tunnel the IP addresses are used in a manner slightly different from the conventional manner used in the security gateway. This modification is introduced in order to change the address(es) on which the identification of the tunnel is based in the security gateway. This is discussed below.

The security gateway operates in the IPSec tunnel mode, i.e. the gateway uses IP-in-IP tunneling when forwarding the IP packets originated from the intranet and destined for the mobile terminal. This is illustrated in FIGS. 2 and 3. FIG. 2 illustrates an IP packet sent by an application server, or another party residing in the intranet, to terminal 105 connected to the Internet. The security gateway takes the entire packet and encapsulates it inside a new IP packet by adding IPSec information and a new IP header outside the original packet. The new packet, which is illustrated in FIG. 3, thus comprises an outer IP header 301 and an inner IP header 302. The outer header comprises the current IP address of the terminal as the destination address and the IP address of the gateway as the source address, while the inner header comprises the original destination and source addresses of the packet. It is beneficial to allocate these original addresses from the address range of the intranet in order to facilitate routing in the intranet.

FIG. 4 illustrates the use of the above-mentioned IP addresses in the environment of FIG. 1 when an application server 103 communicates with terminal 105. The connection across the Internet, i.e. between the terminal and the security gateway is implemented by means of the addresses in the outer header, while the connection between the application server and the terminal is implemented by means of the addresses in the inner IP header. In other words, the application server communicates with the terminal as if the terminal were in the intranet.

In current gateway implementations, the secured connections (i.e. secure tunnels) across the Internet are identified on the basis of the IP addresses of the endpoints of the tunnel, i.e. on the basis of the IP addresses in the outer header of the packet transmitted through the tunnel.

According to an embodiment of the invention, however, this approach is changed in two respects. First, the IP address of the terminal end of the tunnel is no more used for identifying the tunnel. Instead, for packets destined for the terminal being located outside the intranet, the secure tunnel is identified based on the IP address of the terminal seen by the application server, i.e. the address in the inner IP header. When the secure tunnel 106 is being established, the corresponding Security Association (SA) is thus established for the inner address seen by the application servers in the intranet. Second, in the present invention a message is sent from the terminal to the security gateway when the terminal detects that its local IP address has changed. The message may be any message from which the gateway may detect that the address of the terminal has changed. If the terminal has packets to be sent when the change occurs, the terminal sends these packets to the gateway. The gateway deduces the new address from the packets. If the terminal has no packets to be sent when the change occurs, it can construct a dummy packet to indicate the address change to the gateway. A dummy packet here refers to a packet that contains addresses but no relevant data for the gateway.

It is to be noted here that when the secure tunnel is established, the gateway must ensure that the mobile terminal supports the above-described new feature, i.e. that the terminal will send a message when its local address changes. This may be accomplished by a separate negotiation between the gateway and the terminal or by using a fixed configuration in the terminal, which indicates this feature to the gateway.

FIG. 5 illustrates the operation of the terminal and the security gateway in one embodiment of the invention when the local address of the terminal changes. When a mobile terminal 105 detects (step 302) that its local address has changed, it makes an address update decision. Various events 301 may trigger the decision. For example, when moving across IP subnets, the mobile node may obtain a new IP address from an access router. The terminal then sends an address update message to the gateway (step 303). If the terminal has data to be transmitted to the security gateway at the moment of the change, the first data packet sent to the security gateways serves simultaneously as the update message, i.e. no extra packets need to be transmitted. However, if there is no data to be transmitted at the moment of the change, the terminal creates a "dummy"0 message, which serves only as an address update message. This message may be an Internet Control Message Protocol (ICMP) message, for example.

When the gateway receives the message, it uses the Security Parameters Index (SPI) contained in the message to decrypt the encrypted part of the message and to identify the correct tunnel (step 304).

When the correct tunnel has been found based on the SPI, the gateway compares the source address in the outer IP header with the local address that is currently stored in the data associated with the tunnel. If these addresses do not match, the gateway updates (step 305) the current local address associated with the tunnel to correspond with the source address in the outer IP header.

After this, the gateway continues to process the packet in a known manner. However, if the packet was a dummy packet, it is discarded.

For packets destined for the terminal outside the intranet, the tunnel is identified based on the destination address in the data packet received by the gateway, i.e. based on the address that is in the inner IP header of the packet forwarded by the gateway. For this purpose, the gateway stores a table that maps the intranet addresses to the tunnel parameters.

Figure 6:
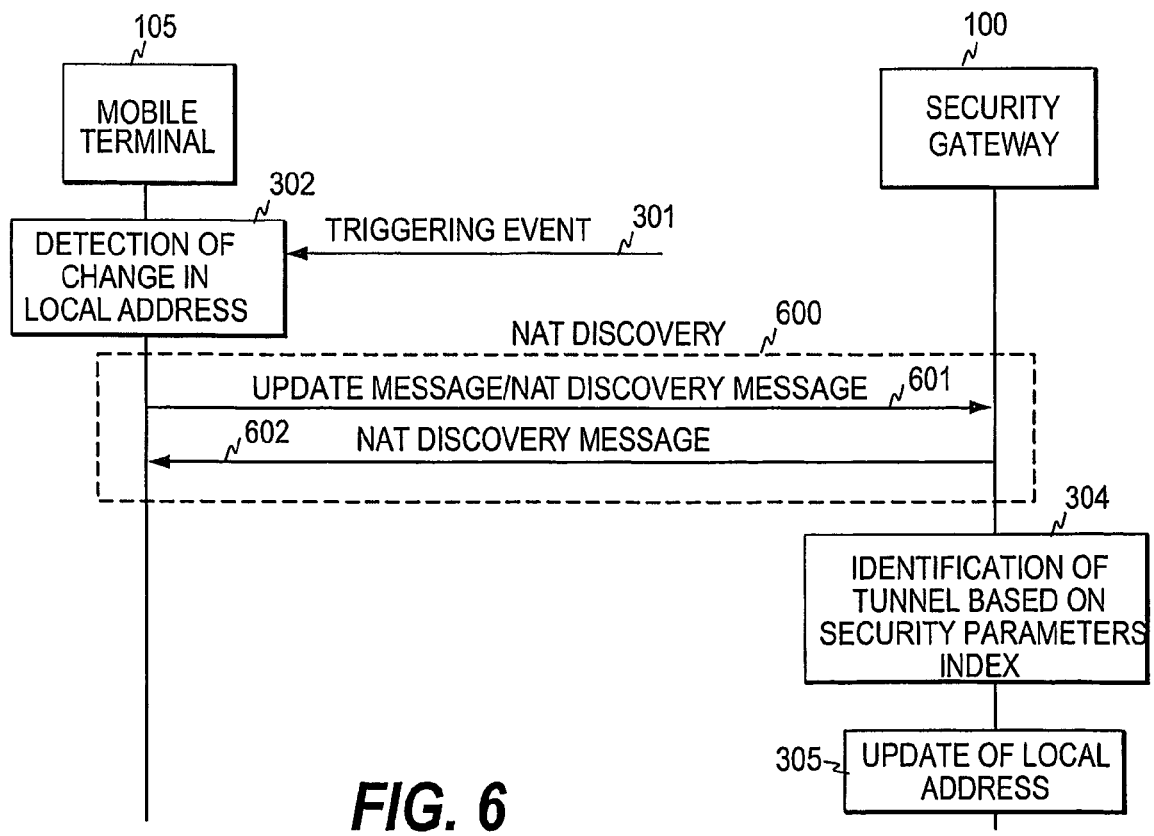
FIG. 6 illustrates the operation of the mobile terminal and the security gateway in another embodiment of the invention, when the mobile terminal detects that its local IP address has changed.

In the above embodiment, it was assumed that there is no Network Address Translation (NAT) between the terminal and the gateway. However, due to the movement of the terminal a network address translation device may appear between the terminal and the gateway and block the traffic between the two hosts. In a further embodiment of the invention, which is suitable for such network environments, the single update message 303 of the embodiment of FIG. 5 is replaced by a standard NAT discovery negotiation in order to detect if there is a network address translation device between the two hosts. As illustrated in FIG. 6, the NAT discovery negotiation 600 includes a first message 601 from the terminal to the gateway, by means of which the gateway can conclude whether there is a network address translation device between the terminal and the gateway and a second message 602 from the gateway to the terminal, by means of which the terminal can conclude whether there is a network address translation device between the gateway and the terminal. The first message 601 simultaneously informs the gateway of a change in the local address of the terminal. The messages use so-called NAT-D (NAT discovery) IKE payloads to detect a network address translation device and they may thus be as specified in the corresponding Internet draft "draft-ietf-ipsec-nat-t-ike-07.txt" (available at http://www.ietf.org/internet-drafts/draft-ietf-ipsec-nat-t-ike-07.txt, visited in November 2003). Using the NAT discovery negotiation instead of a single update message, the two hosts may detect when a network address translation device has appeared between them. If a network address translation device is detected, the terminal and the gateway start to use the NAT traversal protocol, which is an extension to the IPSec, in order to prevent the network address translation device from blocking the traffic between the said two hosts.

Figure 7:
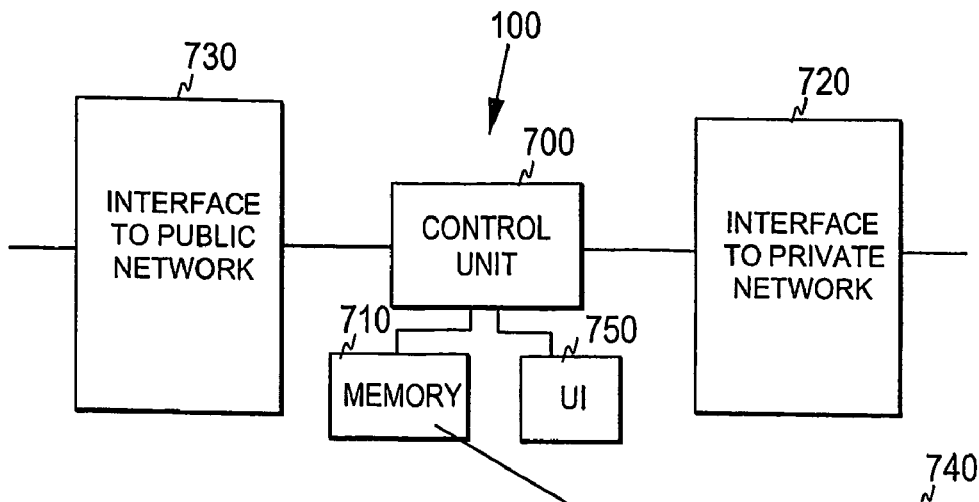
FIG. 7 illustrates the basic elements of a security gateway according to one embodiment of the invention.

FIG. 7 illustrates the basic elements of the gateway in one embodiment of the invention. The core of the gateway is a control unit 700, which is provided with a memory unit 710. The control unit is connected to the interfaces 720 and 730 of the gateway, through which the gateway is connected to networks 101 and 102, respectively. As to the method of the invention, the memory unit stores a table 740 mapping the terminal address in the private network 101 to the correct tunnel. The same table may be used for identifying the correct tunnel based on the SPI, although a different table may be used for identifying the tunnel for packets traveling in the opposite direction. The gateway may further include a user interface 750 for operating the gateway.

Figure 8:
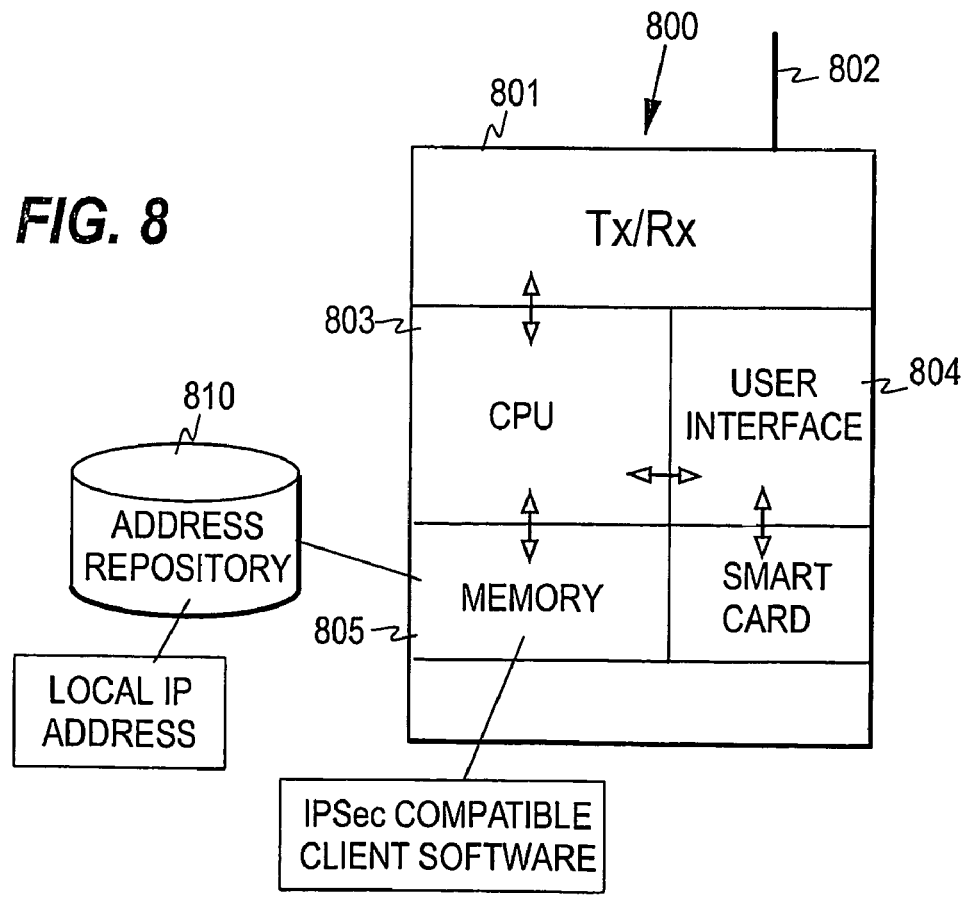
FIG. 8 illustrates the basic elements of a security gateway according to one embodiment of the invention.

FIG. 8 illustrates the basic elements of the terminal according to one embodiment of the invention. The mobile terminal comprises a transceiver 801 provided with at least one antenna 802, a control unit 803, user interface means 804 for creating a user interface through which the user can operate the terminal, and a memory unit 805, which may include one or more smart cards 806, such as a Subscriber Identity Module (SIM) card or a Universal SIM (USIM) card. The memory unit includes the software that the control unit needs for establishing a secure tunnel with the gateway, i.e. an IPSec compatible client software. The memory unit further includes an address repository 810 storing the addresses used by the terminal. The repository includes the current local IP address. When the control unit detects a change in the local address, it handles, under the control of the client software, the sending of the update message to the gateway in order to allow the gateway to update the tunnel data accordingly. As discussed above, the update message may be a dummy packet or a packet including a NAT-D payload for detecting a network address translation device between the mobile terminal and the security gateway.

The data processing environment of the control unit may resemble that of an ordinary PC, and the client software, including the novel features of the invention, may be delivered separately to the mobile terminal, for example in a multimedia card. It is also possible that the novel features, i.e. the program code that causes the control unit to handle the sending of the update message to the security gateway when a change is detected in the local address, are delivered as a plug-in software module to terminals that are provided with conventional client software for establishing a secure tunnel with the security gateway. The plug-in may also be downloaded to the terminal via the network.

Although the invention was described above with reference to the examples shown in the appended drawings, it is obvious that the invention is not limited to these, but may be modified by those skilled in the art without departing from the scope and spirit of the invention. For example, should the standards vary, the implementation of the mechanism of the invention may be varied accordingly.

The invention claimed is:

1. A method comprising:
    establishing a secure tunnel between a security gateway in an second network and a mobile terminal located at a first address in a first network, wherein the first network is a public packet network and the second network is a private packet network and the security gateway connects the first network to a second network and the mobile terminal has a second address that identifies the mobile terminal in the second network;
    in the security gateway, identifying the secure tunnel based on the second address in packets destined for the mobile terminal from the second network
    detecting a change in the first address of the mobile terminal;
    in response to the detecting step, sending an update message to the security gateway, wherein the update message includes a new address value of the first address; and wherein the update message also includes data to be transmitted to the security gateway; and
    based on the update message, updating the first address associated with the secure tunnel; wherein sending comprising creating an update message includes a network address translation discovery payload configured to detect a network address translation device between the mobile terminal and the security gateway.

2. A method according to claim 1, wherein the update message is a normal data message to be transmitted to the security gateway when the change is detected.

3. A method according to claim 1, wherein the sending includes creating a dummy packet and sending it as the update message to the security gateway.

4. An apparatus, comprising:
    tunnel establishment means for establishing a secure tunnel to a security gateway through a packet network; wherein the security gateway is configured to connect a first network to a second network, the first network being a public packet network and the second network being a private packet network, the security gateway is in the second network and the mobile terminal has a first address that depends on its current location in the first network and a second address that identifies the mobile terminal in the second network; and
    address update means for sending an update message through said secure tunnel to the security gateway when the first address changes, wherein the update message includes a new address value of the first address, and wherein the update message also includes data to be transmitted to the security gateway; wherein said address update means comprises means for creating an update messages including a network address translation discovery payload configured to detect a network address translation device between the mobile terminal and the security gateway.

5. An apparatus, comprising:
    tunnel establishment means for establishing a secure tunnel to a mobile terminal located at a first address in a first network, wherein the security gateway is in a second network and configured to connect the first network to a second network, the first network being a public packet network and the second network being a private packet network, and the mobile terminal has a second address that identifies the mobile terminal in the second network;
    identification means for identifying the secure tunnel based on the second address in a packet originated from the second network and destined for the mobile terminal; and
    address update means for updating the first address associated with the secure tunnel, the address update means being responsive to a message received from the mobile terminal, the message including a new value of the first address; wherein said address update means comprises means for creating an update messages including a network address translation discovery payload configured to detect a network address translation device between the mobile terminal and the security gateway.

6. A system, comprising:
    tunnel establishment means for establishing a secure tunnel between a security gateway in a second network and a mobile terminal located at a first address in a first network, wherein the first network is a public packet network and the second network is a private packet network, the security gateway is configured to connect the first network to a second network, and the mobile terminal has a second address that identifies the mobile terminal in the second network;
    detection means for detecting a change in the first address;
    first address update means, responsive to the detection means, for sending an update message to the security gateway, wherein the update message includes a new address value of the first address, and wherein the update message also includes data to be transmitted to the security gateway;
    in the security gateway, second address update means for updating the first address associated with the secure tunnel in response to the update message; and
    in the security gateway, identification means for identifying the secure tunnel based on the second address in a packet originated from the second network and destined for the mobile terminal; and
    update messages creating means for including a network address translation discovery payload configured to detect a network address translation device between the mobile terminal and the security gateway.

7. A computer useable storage medium having computer readable program code embodied therein to enable a mobile terminal to communicate with a security gateway in a packet-based communication system, the computer readable program code comprising:
    computer readable program code configured to cause the mobile terminal to establish a secure tunnel to a security gateway through a packet network; wherein the security gateway is configured to connect a first network to a second network, the first network being a public packet network and the second network being a private packet network, the security gateway is in the second network and the mobile terminal has a first address that depends on its current location in the first network and a second address that identifies the mobile terminal in the second network; and
    computer readable program code configured to cause the mobile terminal to send an update message through said secure tunnel to the security gateway when the first address changes, wherein the update message includes a new address value of the address, and wherein the update message also includes data to be transmitted to the security gateway;
    further comprising creating an update message including a network address translation discovery payload configured to detect a network address translation device between the mobile terminal and the security gateway.

8. A computer useable medium having computer readable program code embodied therein to enable a mobile terminal located at a first address in a first network to communicate with a security gateway in a packet-based communication system, the security gateway being in a second network and configured to connect a first network to a second network, the first network being a public packet network and the second network being a private packet network, and the computer readable program code comprising:
computer readable program code configured to cause the mobile terminal to send an update message through a secure tunnel to the security gateway when a first address that depends on the mobile terminal's current location in the first network changes, wherein the update message includes a new address value of the first address, and wherein the update message also includes data to be transmitted to the security gateway; further comprising creating an update message including a network address translation discovery payload configured to detect a network address translation device between the mobile terminal and the security gateway.

9. A method, comprising:
establishing a secure tunnel from a first network to a security gateway in a second network through a packet network; wherein the security gateway is configured to connect a first network to a second network, the first network is a public packet network and the second network is a private packet network, and the mobile terminal has a first address that depends on its current location in the first network and a second address that identifies the mobile terminal in the second network; and
sending an update message through said secure tunnel to the security gateway when the first address changes, wherein the update message includes a new address value of the first address, and wherein the update message also includes data to be transmitted to the security gateway; wherein sending comprising creating an update message including a network address translation discovery payload configured to detect a network address translation device between the mobile terminal and the security gateway.

10. The method according to claim 9, wherein the update message is a normal data message to be transmitted to the security gateway when the change is detected.

11. The method according to claim 9, wherein the sending includes creating a dummy packet and sending it as the update message to the security gateway.

12. A method, comprising:
establishing a secure tunnel from a second network to a mobile terminal located at a first address in a first network, wherein the security gateway is configured to connect the first network to a second network, the first network is a public packet network and the second network is a private packet network, and the mobile terminal has a second address that identifies the mobile terminal in the second network;
identifying the secure tunnel based on the second address in a packet originated from the second network and destined for the mobile terminal; and
updating the first address associated with the secure tunnel, in response to a message received from the mobile terminal, the message including a new value of the first address;
further comprising creating an update message including a network address translation discovery payload configured to detect a network address translation device between the mobile terminal and the security gateway.

13. The method of claim 12, further comprising:
storing a table mapping the second address with the secure tunnel; and
using the table to identify the secure tunnel.

14. An apparatus, comprising:
a control unit, configured to a memory unit including computer program code,
the memory unit and the computer program code configured to, with the control unit, cause the apparatus at least to, establish a secure tunnel from a first network to a security gateway in a second network through a packet network, wherein the security gateway is configured to connect a first network to a second network, the first network is a public packet network and the second network is a private packet network, and a mobile terminal has a first address that depends on its current location in the first network and a second address that identifies the mobile terminal in the second network, and send an update message through said secure tunnel to the security gateway when the first address changes, wherein the update message includes a new address value of the first address, and wherein the update message also includes data to be transmitted to the security gateway; wherein the control unit is further configured to create an update message including a network address translation discovery payload configured to detect a network address translation device between the mobile terminal and the security gateway.

15. An apparatus according to claim 14, wherein the control unit is configured to create a dummy packet if there is no data to be sent through the secure tunnel when the first address changes.

16. An apparatus, comprising:
a control unit, configured to a memory unit including computer program code, the memory unit and the computer program code configured to, with the control unit, cause the apparatus at least to,
establish a secure tunnel from a first network to a security gateway in a second network through a packet network, wherein the security gateway is configured to connect a first network to a second network, the first network is a public packet network and the second network is a private packet network, and the mobile terminal has a first address that depends on its current location in the first network and a second address that identifies the mobile terminal in the second network,
identify the secure tunnel based on the second address in a packet originated from the second network and destined for the mobile terminal, and
update the first address associated with the secure tunnel, being responsive to a message received from the mobile terminal, the message including a new value of the first address; and creating an update messages including a NAT-D payload configured to detect a network address translation device between the mobile terminal and the security gateway.

17. The apparatus of claim 16, further comprising a stored table mapping the second address with the secure tunnel, and wherein the control unit is further configured to use the table to identify the secure tunnel.

18. The apparatus of claim 16, further comprising a user interface configured to operate the apparatus.

* * * * *